US012179474B2

(12) United States Patent
Yoshigai

(10) Patent No.: US 12,179,474 B2
(45) Date of Patent: Dec. 31, 2024

(54) IMAGE FORMING APPARATUS

(71) Applicant: Shigeru Yoshigai, Kanagawa (JP)

(72) Inventor: Shigeru Yoshigai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 18/154,325

(22) Filed: Jan. 13, 2023

(65) Prior Publication Data

US 2023/0234373 A1 Jul. 27, 2023

(30) Foreign Application Priority Data

Jan. 26, 2022 (JP) ................................ 2022-009943

(51) Int. Cl.

| | |
|---|---|
| ***B41J 11/00*** | (2006.01) |
| ***B41J 2/21*** | (2006.01) |
| ***B41J 25/34*** | (2006.01) |
| *B41J 3/407* | (2006.01) |

(52) U.S. Cl.

CPC ........... *B41J 11/00212* (2021.01); *B41J 2/21* (2013.01); *B41J 25/34* (2013.01); *B41J 2/2117* (2013.01); *B41J 2/2132* (2013.01); *B41J 3/4078* (2013.01)

(58) Field of Classification Search

CPC ........ B41J 11/00212; B41J 2/21; B41J 25/34; B41J 2/2132; B41J 3/4078; B41J 2/2117

See application file for complete search history.

(56) References Cited

U.S. PATENT DOCUMENTS

| | | | | |
|---|---|---|---|---|
| 2008/0225070 | A1 | 9/2008 | Morishita et al. | |
| 2009/0028586 | A1 | 1/2009 | Yamashiro et al. | |
| 2009/0237744 | A1 | 9/2009 | Ogura et al. | |
| 2009/0244568 | A1* | 10/2009 | Watanabe ............ | H04N 1/6027 358/1.9 |
| 2009/0295856 | A1* | 12/2009 | Yoshida ................. | B41J 11/008 347/16 |
| 2016/0067989 | A1 | 3/2016 | Yoshigai et al. | |
| 2016/0082753 | A1 | 3/2016 | Sasaki et al. | |
| 2017/0015112 | A1 | 1/2017 | Yoshigai | |
| 2019/0289161 | A1 | 9/2019 | Yoshigai | |

(Continued)

FOREIGN PATENT DOCUMENTS

| | | |
|---|---|---|
| JP | 2003-341168 | 12/2003 |
| JP | 2009-248312 | 10/2009 |

(Continued)

*Primary Examiner* — Yaovi M Ameh

(74) *Attorney, Agent, or Firm* — IPUSA, PLLC

(57) ABSTRACT

In an image forming apparatus, a sub-scanning carriage moves a recording medium in a conveyance direction. A first carriage and a second carriage move in a main scanning direction and discharge a liquid and another liquid onto the recording medium to print a first image and a second image on the recording medium, respectively. Circuitry executes a first print sequence and a second print sequence. Further, the circuitry calculates a drying time of the liquid to form the first image by the first carriage, determines whether to execute the second print sequence based on the drying time, causes the first carriage and the second carriage to execute the second print sequence when the circuitry determines to execute the second print sequence, and causes the first carriage and the second carriage to execute the first print sequence when the circuitry determines not to execute the second print sequence.

4 Claims, 8 Drawing Sheets

(56) References Cited

U.S. PATENT DOCUMENTS

| | | | |
|---|---|---|---|
| 2021/0309023 | A1 | 10/2021 | Kimata |
| 2022/0274396 | A1 | 9/2022 | Yoshigai |

FOREIGN PATENT DOCUMENTS

| | | |
|---|---|---|
| JP | 2010-076255 | 4/2010 |
| JP | 2020-138416 | 9/2020 |
| JP | 2021-160899 | 10/2021 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2022-009943, filed on Jan. 26, 2022, in the Japan Patent Office, the entire disclosure of which is hereby incorporated by reference herein.

BACKGROUND

Technical Field

Embodiments of the present disclosure relate to an image forming apparatus.

Related Art

A typical inkjet image forming apparatus includes a carriage and a liquid discharge head mounted on the carriage. The liquid discharge head discharges a liquid to a predetermined area on a recording medium while the carriage reciprocally moves in the main scanning direction orthogonal to a conveyance direction of the recording medium to form an image on the recording medium.

SUMMARY

Embodiments of the present disclosure describe an improved image forming apparatus that includes a sub-scanning carriage, a first carriage, a second carriage, and circuitry. The sub-scanning carriage moves a recording medium in a conveyance direction. The first carriage moves in a main scanning direction orthogonal to the conveyance direction and discharges a liquid onto the recording medium to print a first image on the recording medium. The second carriage moves in the main scanning direction and discharges another liquid different from the liquid onto the first image on the recording to print a second image on the first image of the recording medium. The circuitry causes the second carriage to print the second image after causing the first carriage to finish printing the first image, to execute a first print sequence, and causes the second carriage to print the second image while causing the first carriage to print the first image, to execute a second print sequence. Further, the circuitry calculates a drying time of the liquid to form the first image by the first carriage, determines whether to execute the second print sequence based on the drying time, causes the first carriage and the second carriage to execute the second print sequence when the circuitry determines to execute the second print sequence, and cause the first carriage and the second carriage to execute the first print sequence when the circuitry determines not to execute the second print sequence.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
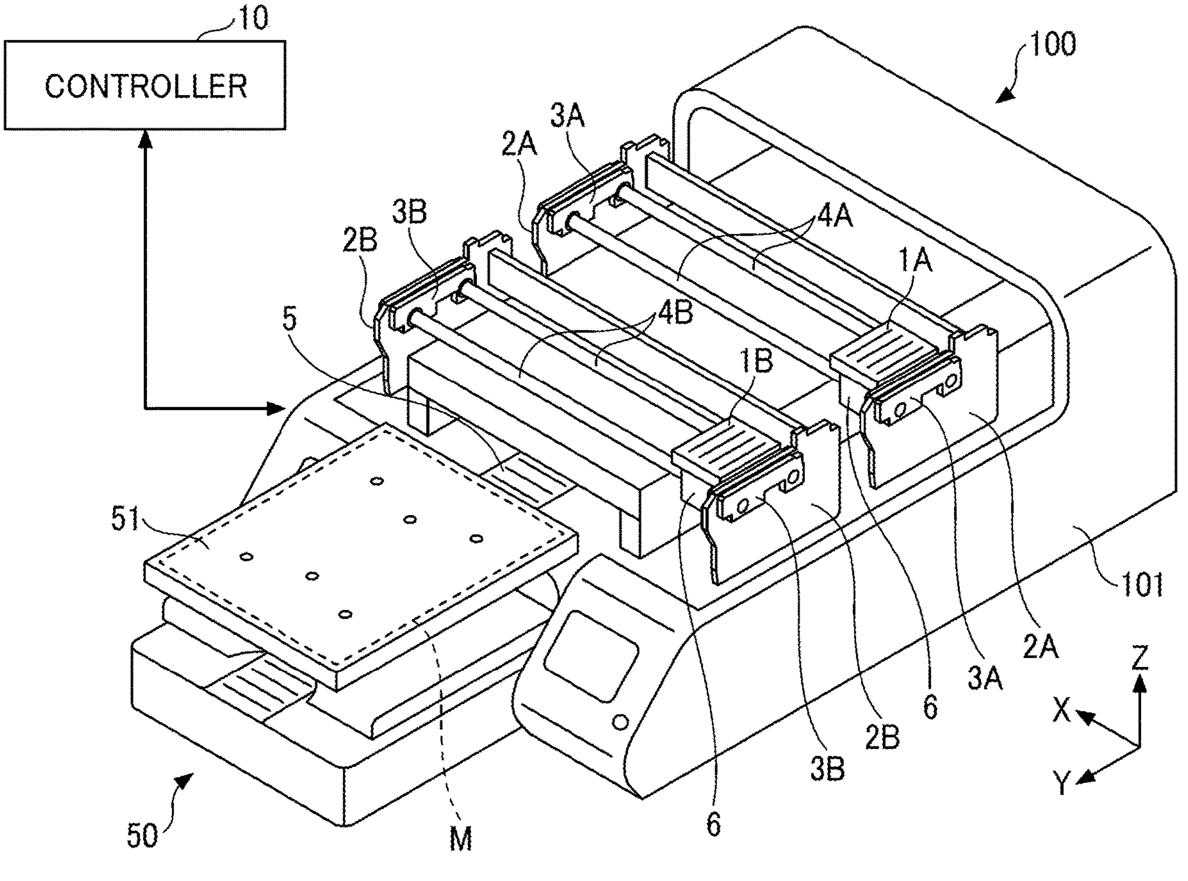
FIG. 1 is a perspective view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the accompanying drawings. In each of the drawings, the same reference codes are allocated to components having the same structure for ease of understanding, and redundant descriptions thereof may be omitted.

In the following description, an X direction, a Y direction, and a Z direction are perpendicular to each other. The X direction and the Y direction are horizontal directions, and the Z direction is a vertical direction. The X direction is a main scanning direction and is a left-right direction (width direction) of an image forming apparatus 100. The Y direction is a sub-scanning direction, a conveyance direction of a recording medium M, and a front-back direction of the image forming apparatus 100. The Z direction is a vertical direction of the image forming apparatus 100. In the following description, a positive Y direction side is referred to as a front side of the image forming apparatus 100 or a downstream side in the conveyance direction, and a negative Y direction side is referred to as a back side of the image forming apparatus 100 or an upstream side in the conveyance direction. A positive Z direction side is referred to as an upper side, and a negative Z direction side is referred to as a lower side.

Configuration of Image Forming Apparatus

FIG. 1 is a perspective view of the image forming apparatus 100 according to an embodiment of the present disclosure. As illustrated in FIG. 1, the image forming apparatus 100 according to the present embodiment is an inkjet image forming apparatus including a carriage 1 and a liquid discharge head 6 mounted on the carriage 1. The liquid discharge head 6 discharges a liquid to a predetermined area on the recording medium M while the carriage 1 reciprocally moves in the main scanning direction orthogonal to the conveyance direction of the recording medium M to form an image on the recording medium M. As illustrated in FIG. 1, the image forming apparatus 100 according to the present embodiment includes two carriages 1 (i.e., a first carriage 1A and a second carriage 1B). The first carriage 1A and the second carriage 1B are individually driven to form images, thereby increasing a print speed of the image forming apparatus 100.

As illustrated in FIG. 1, the image forming apparatus 100 includes the first carriage 1A, the second carriage 1B, a pair of first side plates 2A, a pair of second side plates 2B, first adjustment plates 3A as a pair of first holders, second adjustment plates 3B as a pair of second holders, first guide rods 4A as a pair of first guides, and second guide rods 4B as a pair of second guides. Note that the first carriage 1A and the second carriage 1B are also collectively referred to as the carriages 1 or referred to as the carriage 1 unless distinguished. The first side plates 2A and the second side plates 2B are also collectively referred to as side plates 2 or referred to as a side plate 2 unless distinguished. The first adjustment plates 3A and the second adjustment plates 3B are also collectively referred to as adjustment plates 3 or referred to as an adjustment plate 3 unless distinguished. The first guide rods 4A and the second guide rods 4B are also collectively referred to as guide rods 4 or referred to as a guide rod 4 unless distinguished. In FIG. 1, an eccentric cam that adjusts the position of the adjustment plate 3 is omitted.

The side plates 2 are disposed on both sides in the left-right direction of the image forming apparatus 100 and are secured to a body 101 of the image forming apparatus 100. The side plate 2 movably holds the adjustment plate 3 in the Y direction and the Z direction. Both ends of the guide rod 4 are respectively held by the adjustment plates 3. Each adjustment plate 3 holds two guide rods 4 in the Y direction. The carriage 1 is supported by the guide rods 4 so that the carriage is movable along the guide rods 4. The carriage 1 includes multiple liquid discharge heads 6. The liquid discharge head 6 has a nozzle face on a lower surface thereof. The image forming apparatus 100 includes a rail 5 extending on the body 101 in the Y direction.

A cassette 50 is detachably attached to the image forming apparatus 100. The cassette 50 includes a stage 51 in an upper portion thereof. The cassette 50 holds the recording medium M, on which an image is to be printed, on the stage 51. Examples of the recording medium M includes cloth. When the cassette 50 is attached to the image forming apparatus 100, the stage 51 can be moved onto the rail 5 of the image forming apparatus 100. The stage 51 moves on the rail 5 in the conveyance direction (Y direction). At this time (while the stage 51 moves on the rail 5), the liquid discharge head 6 of the carriage 1 discharges ink as a liquid onto the recording medium M on the stage 51 while the carriage 1 reciprocally moves on the guide rod 4 in the main scanning direction (X direction). As a result, an image is formed on the recording medium M. Since the image forming apparatus 100 includes the multiple carriages 1 (i.e., the first carriage 1A and the second carriage 1B), inks of different colors can be discharged onto the recording medium M, and the print speed on the recording medium M can be increased, thereby improving the producibility of the image forming apparatus 100.

The image forming apparatus 100 illustrated in FIG. 1 can print an image on any type of the recording medium M to which a liquid such as ink can adhere. Examples of the recording medium M further include paper, fabric, a film, an electronic substrate, an electronic component such as a piezoelectric element, a powder layer, an organ model, and a testing cell. The cassette 50 may also be referred to as an element that can move the stage 51 on which the recording medium M is placed in the conveyance direction (sub-scanning direction), and thus may also be referred to as a "sub-scanning carriage 50" in the following description.

The first carriage 1A and the second carriage 1B can individually print an image on the recording medium M in the main scanning direction orthogonal to the conveyance direction. The first carriage 1A and the second carriage 1B are arranged in parallel in the conveyance direction. In the present embodiment, as illustrated in FIG. 1, the image forming apparatus 100 has a configuration in which the first carriage 1A is disposed on the upstream side (negative Y direction side) in the conveyance direction and the second carriage 1B is disposed on the downstream side (positive Y direction side) in the conveyance direction, but the configuration is not limited thereto, and the arrangement of the first carriage 1A and the second carriage 1B illustrated in FIG. 1 may be reversed. Further, in the present embodiment, the first carriage 1A on the upstream side discharges white ink onto the recording medium M to perform white printing, and the second carriage 1B on the downstream side discharges one or more color inks other than white ink onto the recording medium M to perform color printing, but a combination of colors is not limited the above example and may be different from the above example.

The image forming apparatus 100 further includes a controller 10 as circuitry. The controller 10 controls operations of the first carriage 1A, the second carriage 1B, and the sub-scanning carriage 50. Although the controller 10 is illustrated outside the image forming apparatus 100 in FIG. 1 for convenience of illustration, the controller 10 is installed inside the image forming apparatus 100. Some or all of the functions of the controller 10 may be implemented by an external personal computer (PC) or the like. The controller 10 serves as a computer system that physically includes a central processing unit (CPU), a random access memory (RAM) and a read only memory (ROM) as a main storage devices, a communication module, an auxiliary storage device, and the like. For example, the CPU loads predetermined computer software in the RAM, operates various hardware under the control of the CPU, and reads and writes data from and to the RAM, thereby implementing each function of the controller 10 described above and below.

Print Pattern (Print Sequence)

According to the present embodiment, when the image forming apparatus 100 includes the two carriages 1 (the first carriage 1A and the second carriage 1B), the controller 10 performs two print patterns of a "first print pattern" and a "second print pattern" which are described below. An operation of each print pattern is described with reference to an example in which the first carriage 1A performs the white printing and the second carriage 1B performs the color printing.

Figure 2:
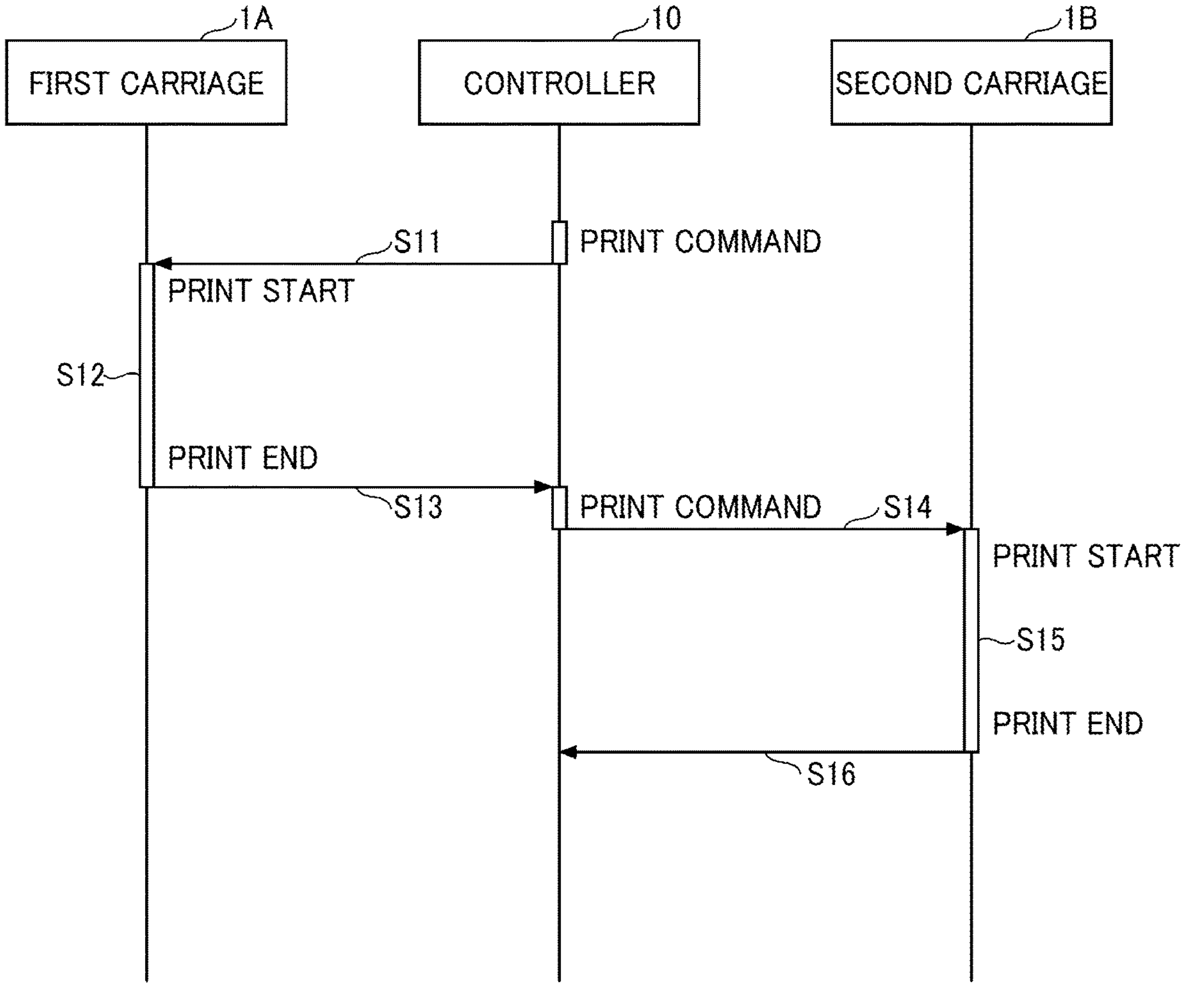
FIG. 2 is a sequence diagram of a first print pattern according to an embodiment of the present disclosure.
Figure 3A:
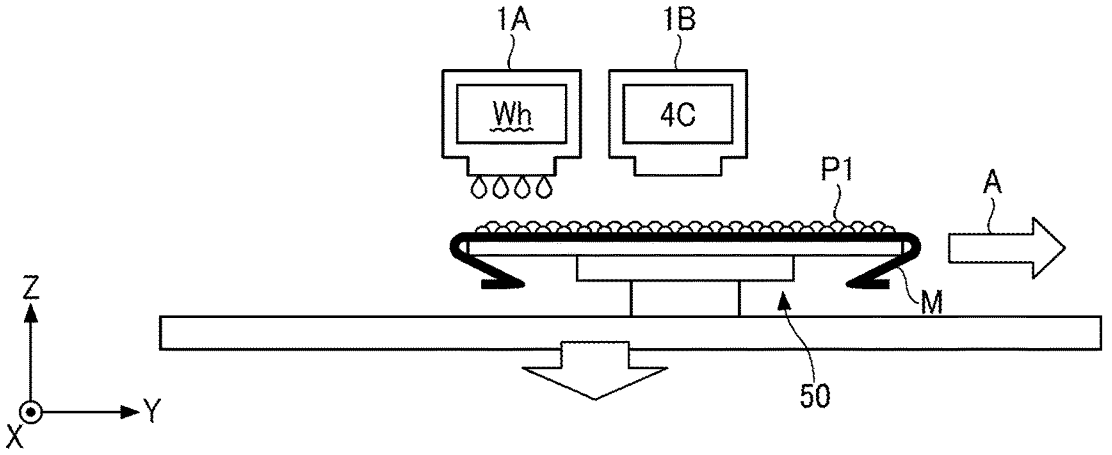
FIGS. 3A to 3C are schematic diagrams illustrating an operation of the first print pattern.
Figure 3B:
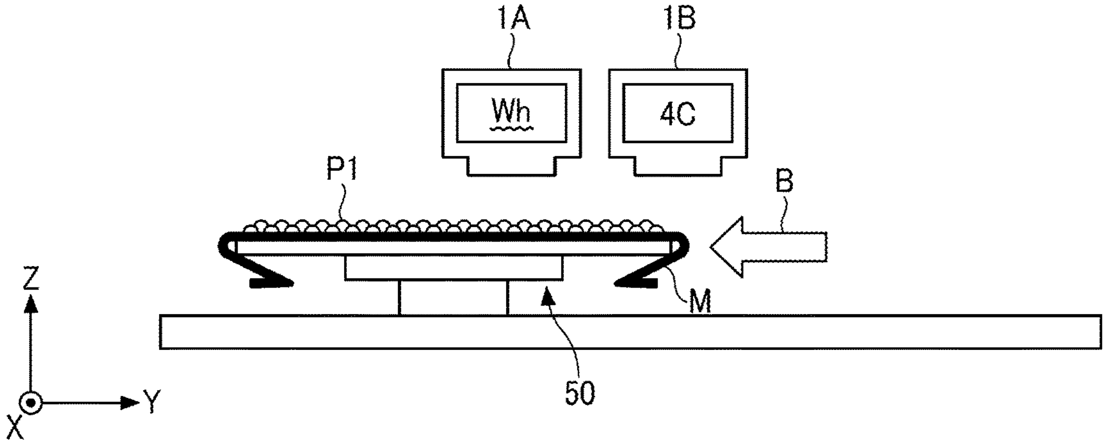
Figure 3C:
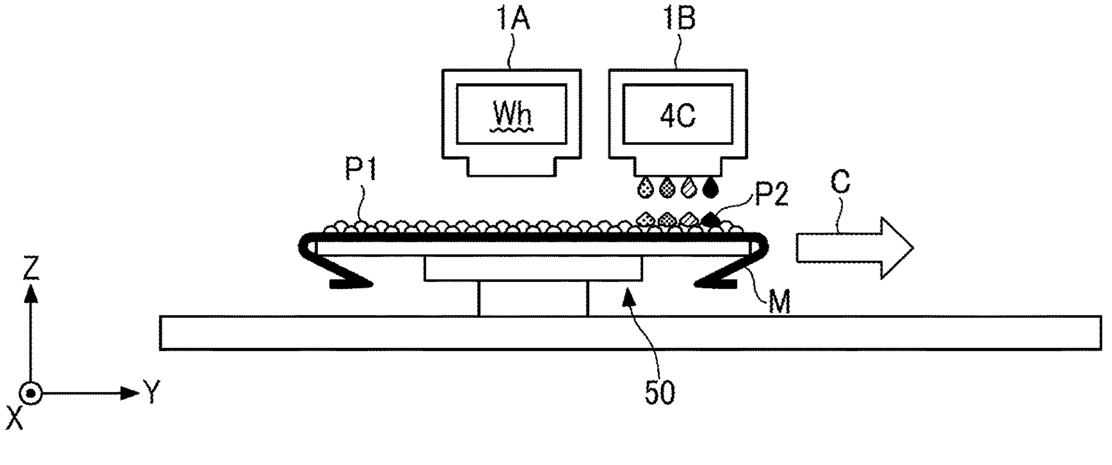

The first print pattern (i.e., a first print sequence) is described with reference to FIG. 2 and FIGS. 3A to 3C. FIG. 2 is a sequence diagram of the first print pattern. FIGS. 3A to 3C are schematic diagrams illustrating the operation of the first print pattern. In the "first print pattern," the first carriage 1A performs the white printing on an entire surface of the recording medium M. After the white printing, the second carriage 1B performs the color printing on the recording medium M painted white. In other words, in the first print pattern, after the first carriage 1A has finished printing on the entire surface of the recording medium M, the second carriage 1B prints on the entire surface of the recording medium M. Here, the terms "printing on the entire surface" does not necessarily mean that the white printing (or the color printing) covers the entire recording medium M without a blank portion, and means that the white printing (or the color printing) has been performed on all desired portions of the entire recording medium M. That is, there may be a blank portion other than all the desired portions on the recording medium M.

The controller 10 moves the sub-scanning carriage 50 to a print start position of the first carriage 1A. Then, in step S11 of the sequence diagram illustrated in FIG. 2, the controller 10 transmits a print command to the first carriage 1A. The first carriage 1A performs the white printing in response to reception of the print command (step S12). During the white printing, while the sub-scanning carriage 50 moves the recording medium M in the sub-scanning direction (toward the front side of the image forming apparatus 100), the first carriage 1A reciprocally moves in the main scanning direction and discharges ink (e.g., white ink Wh) onto the recording medium M. When the first carriage 1A completes the white printing on the entire surface of the recording medium M, the first carriage 1A transmits information indicating print end to the controller 10 (step S13).

In FIG. 3A, the first carriage 1A has performed white printing P1 while the sub-scanning carriage 50 moves the recording medium M toward the front side of the image forming apparatus 100 (in the positive Y direction) indicated by arrow A and has completed the white printing P1 on the recording medium M in step S13. With reference again to FIG. 2, when the controller 10 receives the information indicating print end from the first carriage 1A, as illustrated in FIG. 3B, the controller 10 moves the sub-scanning carriage 50 toward the back side of the image forming apparatus 100 (in the negative Y direction) indicated by arrow B to move the recording medium M to a print start position of the second carriage 1B. Then, in step S14 of the sequence diagram illustrated in FIG. 2, the controller 10 transmits the print command to the second carriage 1B.

The second carriage 1B performs the color printing in response to reception of the print command (step S15). During the color printing, while the sub-scanning carriage 50 moves the recording medium M in the sub-scanning direction (toward the front side of the image forming apparatus 100), the second carriage 1B reciprocally moves in the main scanning direction and discharges ink (e.g., color ink 4C such as cyan ink, magenta ink, yellow ink, and black ink) onto the recording medium M. When the second carriage 1B completes the color printing on the entire surface of the recording medium M, the second carriage 1B transmits information indicating print end to the controller 10 (step S16), that is, printing on the recording medium M has been completed. The recording medium M on which the printing has been completed is sent out to the front end of the image forming apparatus 100 by the sub-scanning carriage 50. In FIG. 3C, the second carriage 1B performs color printing P2 while the sub-scanning carriage 50 moves the recording medium M toward the front side of the image forming apparatus 100 (in the positive Y direction) indicated by arrow C to superimpose the color printing P2 over the white printing P1 performed on the recording medium M.

Figure 4:
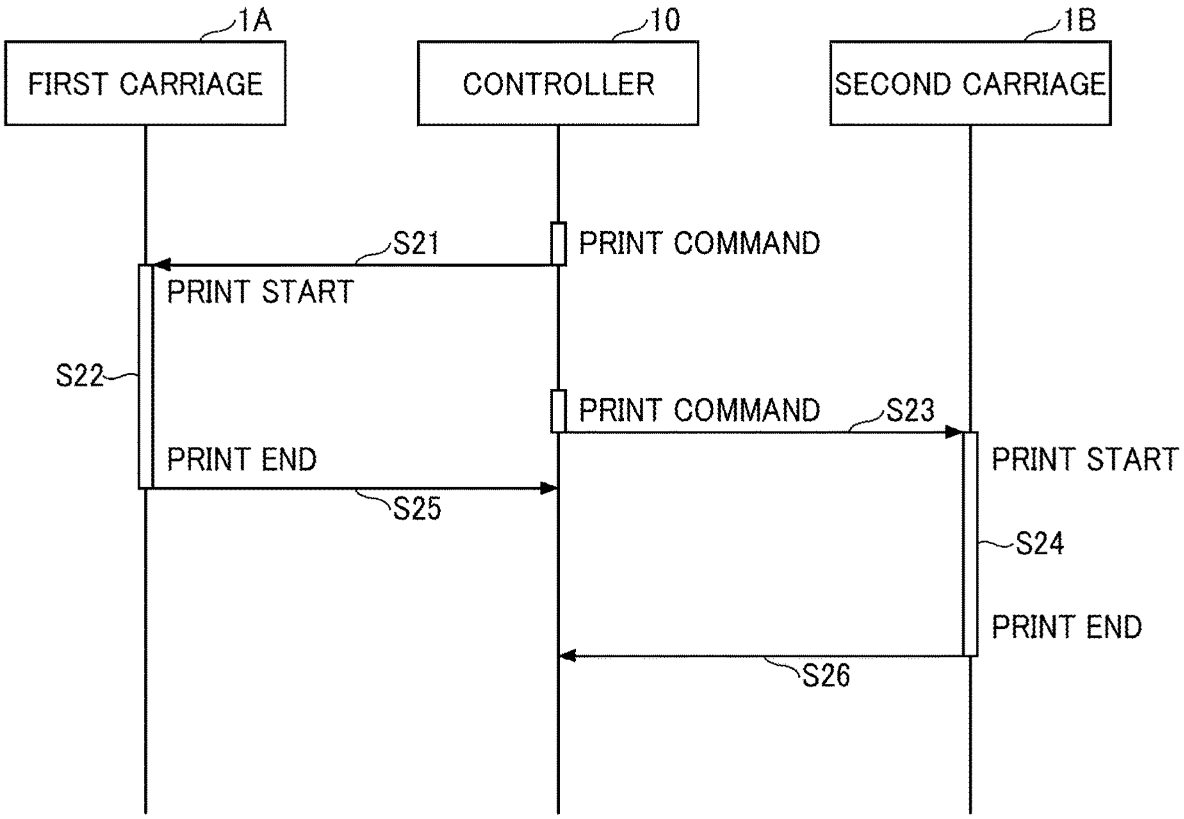
FIG. 4 is a sequence diagram of a second print pattern according to an embodiment of the present disclosure.
Figure 5A:
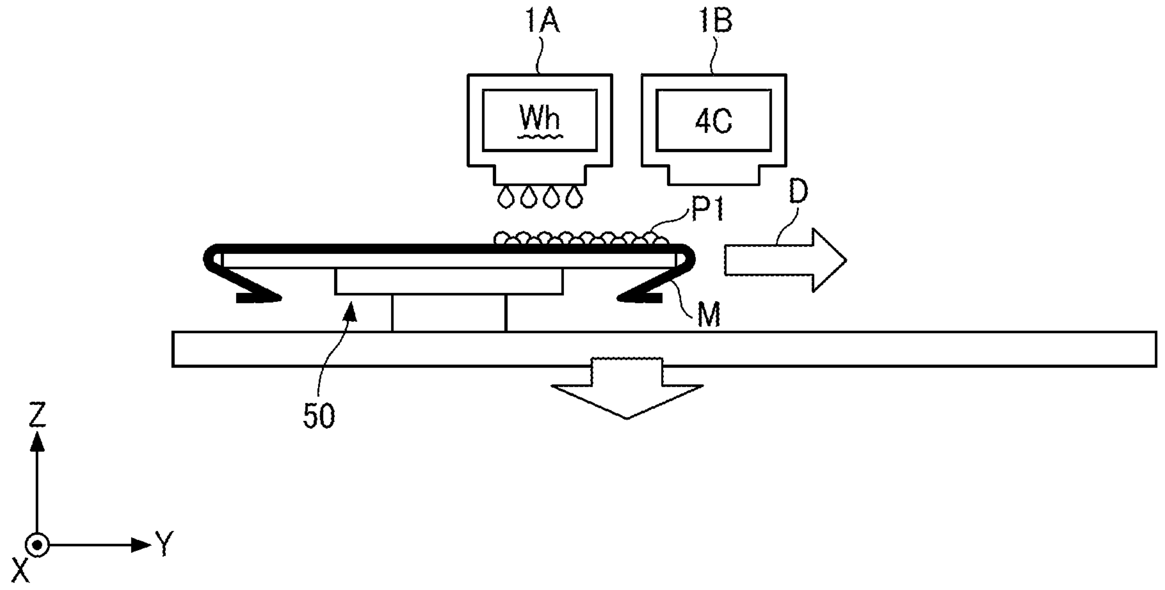
FIGS. 5A and 5B are schematic diagrams illustrating an operation of the second print pattern.
Figure 5B:
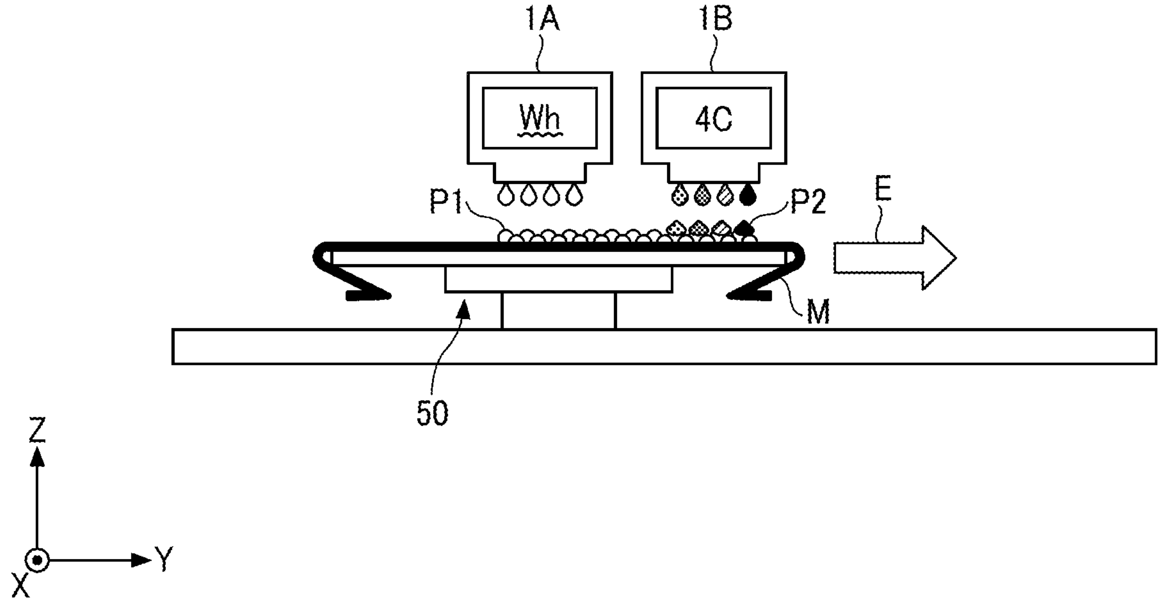

The second print pattern (i.e., a second print sequence) is described with reference to FIG. 4 and FIGS. 5A and 5B. FIG. 4 is a sequence diagram of the second print pattern. FIGS. 5A and 5B are schematic diagrams illustrating the operation of the second print pattern. In the "second print pattern," while the first carriage 1A performs the white printing, the second carriage 1B also performs the color printing on a portion of the recording medium M on which the white printing by the first carriage 1B has been completed. In other words, in the second print pattern, after the first carriage 1A has been finished printing on a portion of the recording medium, the second carriage 1B prints on the portion of the recording medium M while first carriage 1A prints on the other portion of the recording medium. In the second print pattern, the first carriage 1A and the second carriage 1B simultaneously perform printing operations, thereby increasing the print speed.

The controller 10 moves the sub-scanning carriage 50 to the print start position of the first carriage 1A. Then, in step S21 of the sequence diagram illustrated in FIG. 4, the controller 10 transmits the print command to the first carriage 1A. The first carriage 1A performs the white printing in response to reception of the print command (step S22). During the white printing, while the sub-scanning carriage 50 moves the recording medium M in the sub-scanning direction (toward the front side of the image forming apparatus 100), the first carriage 1A reciprocally moves in the main scanning direction and discharges ink onto the recording medium M. When the first carriage 1A completes the white printing on the entire surface of the recording medium M, the first carriage 1A transmits information indicating print end to the controller 10 (step S25).

Before the first carriage 1A completes the white printing, when a front side portion of the recording medium M on which the white printing by the first carriage 1A has been performed reaches the print start position of the second carriage 1B, the controller 10 transmits the print command to the second carriage 1B (step S23). In FIG. 5A, the first carriage 1A performs the white printing P1 while the sub-scanning carriage 50 moves the recording medium M toward the front side of the image forming apparatus 100 (in the positive Y direction) indicated by arrow D, and the front side portion of the recording medium M on which the white printing by the first carriage 1A has been performed reaches the print start position of the second carriage 1B during the white printing.

The second carriage 1B performs the color printing in response to reception of the print command (step S24). During the color printing, while the sub-scanning carriage 50 moves the recording medium M in the sub-scanning direction (toward the front side of the image forming apparatus 100), the second carriage 1B reciprocally moves in the main scanning direction and discharges ink onto the recording medium M. When the second carriage 1B completes the color printing on the entire surface of the recording medium M, the second carriage 1B transmits information indicating print end to the controller 10 (step S26), that is, printing on the recording medium M has been completed.

In FIG. 5B, the first carriage 1A performs the white printing P1 while the sub-scanning carriage 50 moves the recording medium M toward the front side of the image forming apparatus 100 (in the positive Y direction) indicated by arrow E. At the same time, the second carriage 1B performs the color printing P2 on the portion of the recording medium M on which the white printing by the first carriage 1A has been performed (step S24). Accordingly, as compared with the first print pattern, the printing operations of the first carriage 1A and the second carriage 1B can be simultaneously performed in the second print pattern, thereby increasing the print speed. However, in the second print pattern, a drying time of the white printing P1 (white ink) discharged onto the recording medium M from when the white printing P1 has been discharged (at a finishing position of the first carriage 1A) until the color printing starts (at a start position of the second carriage 1B) is likely be shortened. As a result, the image quality may be degraded compared with the first print pattern. This point is described with reference to FIGS. 6A to 7B.

Figure 6A:
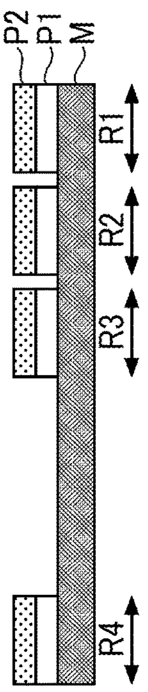
FIGS. 6A and 6B are schematic diagrams illustrating an example of a print sequence when a print area is relatively large.
Figure 6B:
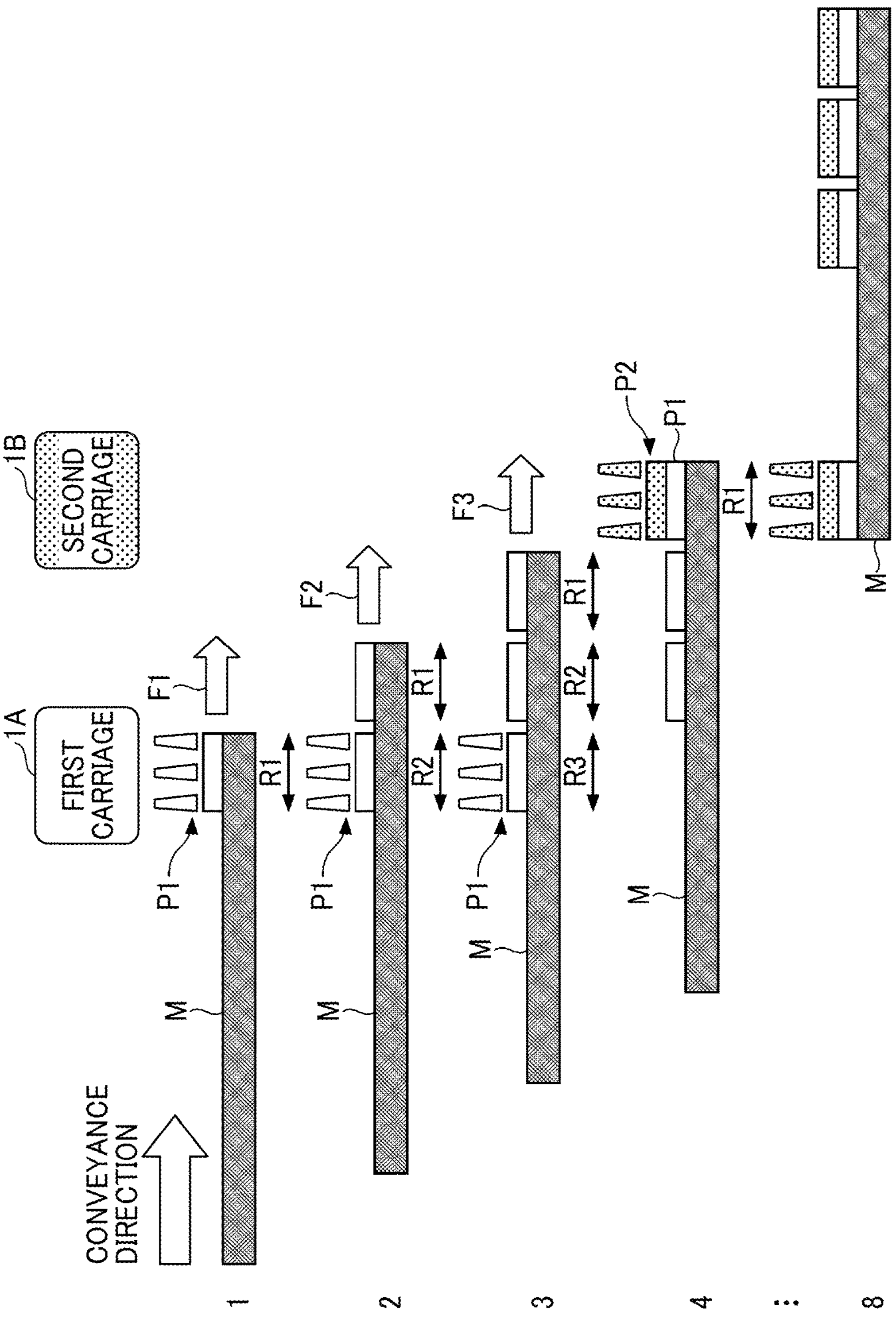

FIGS. 6A and 6B are schematic diagrams illustrating an example of a print sequence when a print area by the first carriage 1A is relatively large. FIG. 6A illustrates an example of the arrangement of each color in an entire image printed on the recording medium M. FIG. 6B is a diagram illustrating a procedure for forming the image illustrated in FIG. 6A on the recording medium M. The front side (positive Y direction side) of the recording medium M in the conveyance direction is the right side in FIG. 6B, and the procedure is performed from top to bottom in FIG. 6B. In this example, the procedure has eight steps.

As illustrated in FIG. 6A, in this example, the white printing P1 and the color printing P2 are performed in four areas of a frontmost area R1, a second area R2, a third area R3, and a backmost area R4 on the recording medium M in the conveyance direction, respectively, and the number of areas is relatively larger than that in an example of FIGS. 7A and 7B described later. When the image illustrated in FIG. 6A is printed, for example, as illustrated in FIG. 6B, in the first step, the sub-scanning carriage 50 moves the recording medium M so that the frontmost area R1 of the recording medium M reaches a printing position of the first carriage 1A. Then, the first carriage 1A performs the white printing P1 on the frontmost area R1 of the recording medium M.

In the second step, as indicated by arrow F1 in FIG. 6B, the sub-scanning carriage 50 further moves the recording medium M toward the front side in the conveyance direction so that the second area R2 from the front side of the recording medium M reaches the printing position of the first carriage 1A. Then, the first carriage 1A performs the white printing P1 on the second area R2 of the recording medium M. In the third step, as indicated by arrow F2 in FIG. 6B, the sub-scanning carriage 50 further moves the recording medium M toward the front side in the conveyance direction so that the third area R3 from the front side of the recording medium M reaches the printing position of the first carriage 1A. Then, the first carriage 1A performs the white printing P1 on the third area R3 of the recording medium M.

In the fourth step, as indicated by arrow F3 in FIG. 6B, the sub-scanning carriage 50 further moves the recording medium M toward the front side in the conveyance direction so that the frontmost area R1 of the recording medium M reaches a printing position of the second carriage 1B. In the frontmost area R1, the white printing P1 has been performed in the first step. Then, the second carriage 1B performs the color printing P2 on the white printing P1 performed on the frontmost area R1 of the recording medium M. Thereafter, the white printing P1 and the color printing P2 are sequentially performed on the second, third, and backmost areas R2, R3, and R4 on the recording medium M, thereby completing all printing in the eighth steps.

In the example illustrated in FIGS. 6A and 6B, the color printing P2 is performed, in the fourth step, in the frontmost area R1 where the white printing P1 has been performed in the first step, and as indicated by arrows F1, F2, and F3 in FIG. 6B, an amount of movement of the recording medium M in each step is relatively small. Accordingly, there is a waiting time corresponding to the three steps from when the white printing P1 has been performed in the frontmost area R1 until the color printing P2 is performed in the same frontmost area R1. As a result, the drying time of the white printing P1 is relatively long.

Figures 7A, 7B:
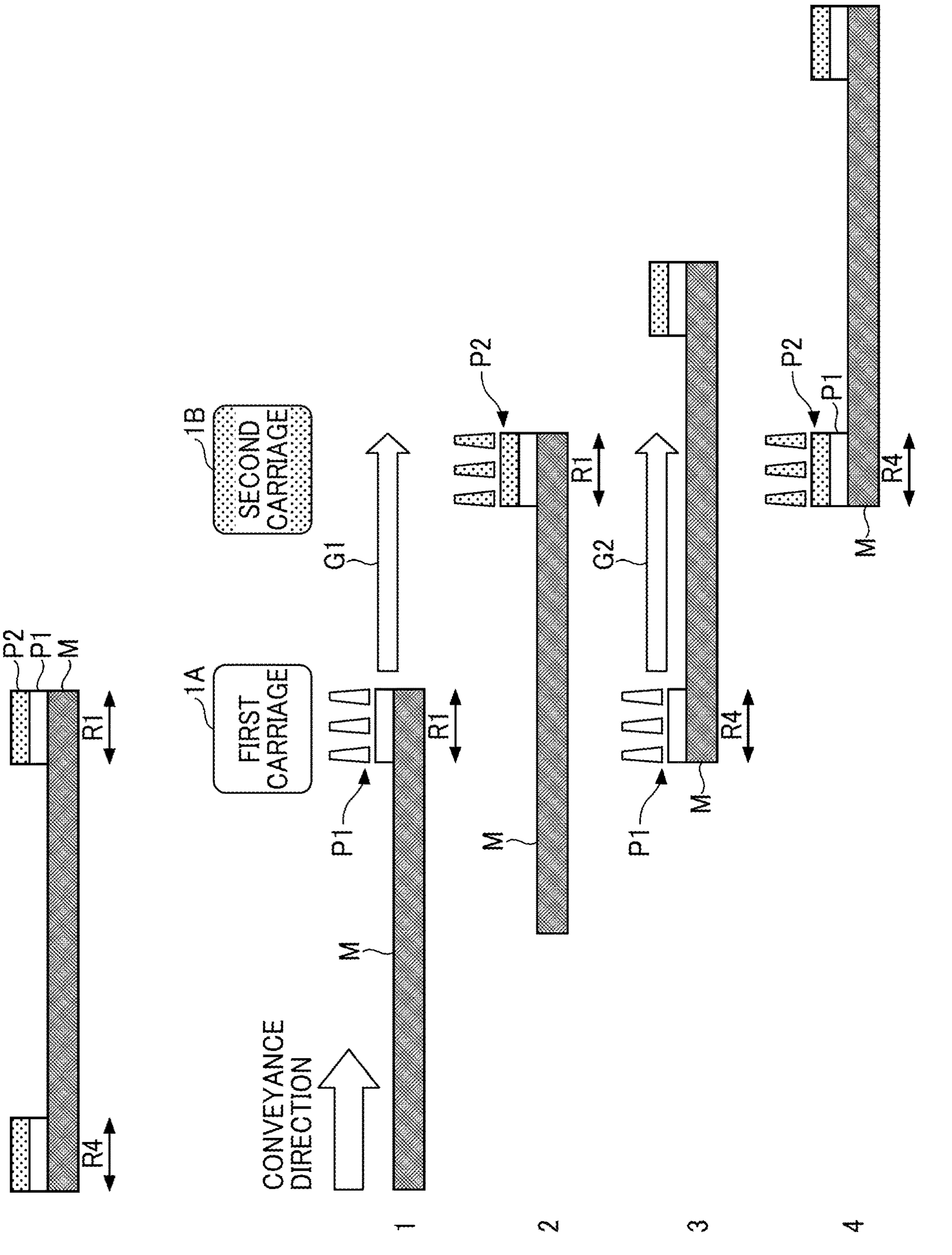
FIGS. 7A and 7B are schematic diagrams illustrating an example of a print sequence when the print area is relatively small.

FIGS. 7A and 7B are schematic diagrams illustrating an example of a print sequence when a print area by the first carriage 1A is relatively small. Similarly to FIG. 6A, FIG. 7A illustrates an example of the arrangement of each color in an entire image printed on the recording medium M. Similarly to FIG. 6B, FIG. 7B is a diagram illustrating a procedure for forming the image illustrated in FIG. 7A on the recording medium M. In this example, the procedure has four steps.

As illustrated in FIG. 7A, in this example, the white printing P1 and the color printing P2 are performed in two areas of the frontmost area R1 and the backmost area R4 on the recording medium M, respectively, and the number of areas is relatively smaller than that in the example of FIGS. 6A and 6B described above. In addition, an interval between the frontmost area R1 and the backmost area R4 is relatively wide. When the image illustrated in FIG. 7A is printed, for example, as illustrated in FIG. 7B, in the first step, the sub-scanning carriage 50 moves the recording medium M so that the frontmost area R1 of the recording medium M reaches the printing position of the first carriage 1A. Then, the first carriage 1A performs the white printing P1 on the frontmost area R1 of the recording medium M.

In the second step, as indicated by arrow G1 in FIG. 7B, the sub-scanning carriage 50 further moves the recording medium M toward the front side in the conveyance direction so that the frontmost area R1 of the recording medium M reaches the printing position of the second carriage 1B. In the frontmost area R1, the white printing P1 has been performed in the first step. Then, the second carriage 1B performs the color printing P2 on the white printing P1 performed on the frontmost area R1 of the recording medium M. In the third step, the sub-scanning carriage 50 further moves the recording medium M toward the front side in the conveyance direction so that the backmost area R4 of the recording medium M reaches the printing position of the first carriage 1A. Then, the first carriage 1A performs the white printing P1 on the backmost area R4 of the recording medium M.

In the fourth step, as indicated by arrow G2 in FIG. 6B, the sub-scanning carriage 50 further moves the recording medium M toward the front side in the conveyance direction so that the backmost area R4 of the recording medium M reaches the printing position of the second carriage 1B. In the backmost area R4, the white printing P1 has been performed in the third step. Then, the second carriage 1B performs the color printing P2 on the white printing P1 performed on the backmost area R4 of the recording medium M. Thus, the fourth step ends, thereby completing all printing.

In the example illustrated in FIGS. 7A and 7B, the color printing P2 is performed, in the second step, in the frontmost area R1 where the white printing P1 has been performed in the first step, and the color printing P2 is performed, in the fourth step, in the backmost area R4 where the white printing P1 has been performed in the third step. As a result, the amount of movement of the recording medium M in each step is relatively large as indicated by arrows G1 and G2 in FIG. 7B. Accordingly, there is a waiting time corresponding to only the one step from when the white printing P1 has been performed in the frontmost area R1 until the color printing P2 is performed in the same frontmost area R1. As a result, the drying time of the white printing P1 is likely to be relatively shortened.

Further, as illustrated in FIGS. 7A and 7B, as the interval between the frontmost area R1 and the backmost area R4 where the white printing P1 by the first carriage 1A is performed is relatively wide in the image to be printed on the recording medium M, the amount of movement of the recording medium M between the respective steps of the print sequence increases, and thus the waiting time from when the white printing P1 has been performed in an area until the color printing P2 is performed in the same area is likely to be shortened.

On the other hand, in the first print pattern described with reference to FIGS. 2 and FIGS. 3A to 3B, after the first carriage 1A has been completed the white printing P1 on the entire surface of the recording medium M, the sub-scanning carriage 50 moves the recording medium M toward the upstream side in the conveyance direction from the state in which the backmost area of the recording medium M is disposed at the printing position of the first carriage 1A to the state in which the frontmost area of the recording medium M is disposed at the printing position of the second carriage 1B. That is, when focusing on the frontmost area of the recording medium M, in the first print pattern, there is the drying time from when the white printing P1 has been performed until the color printing P2 is performed, corresponding to one reciprocal movement of the entire recording medium M in the conveyance direction.

As described above, in the second print pattern, the drying time of the white ink from when the white printing P1 has been performed until the color printing P2 starts is likely to be shortened compared with that in the first print pattern. If the color printing P2 is performed when the drying time of the white printing P1 is insufficient, the white ink and the color ink may be mixed with each other, and thus the image quality may be degraded compared with that in the first print pattern. In the present embodiment, the image quality is prevented from being degraded, and the second print pattern can be performed to increase the print speed.

In the present embodiment, the controller 10 calculates the drying time of the ink of the white printing to be performed on the recording medium M by the first carriage 1A disposed upstream from the second carriage 1B in the conveyance direction, and performs a print pattern selection control to determine whether to perform the second print pattern based on the calculated drying time.

Print Pattern Selection Control

Figure 8:
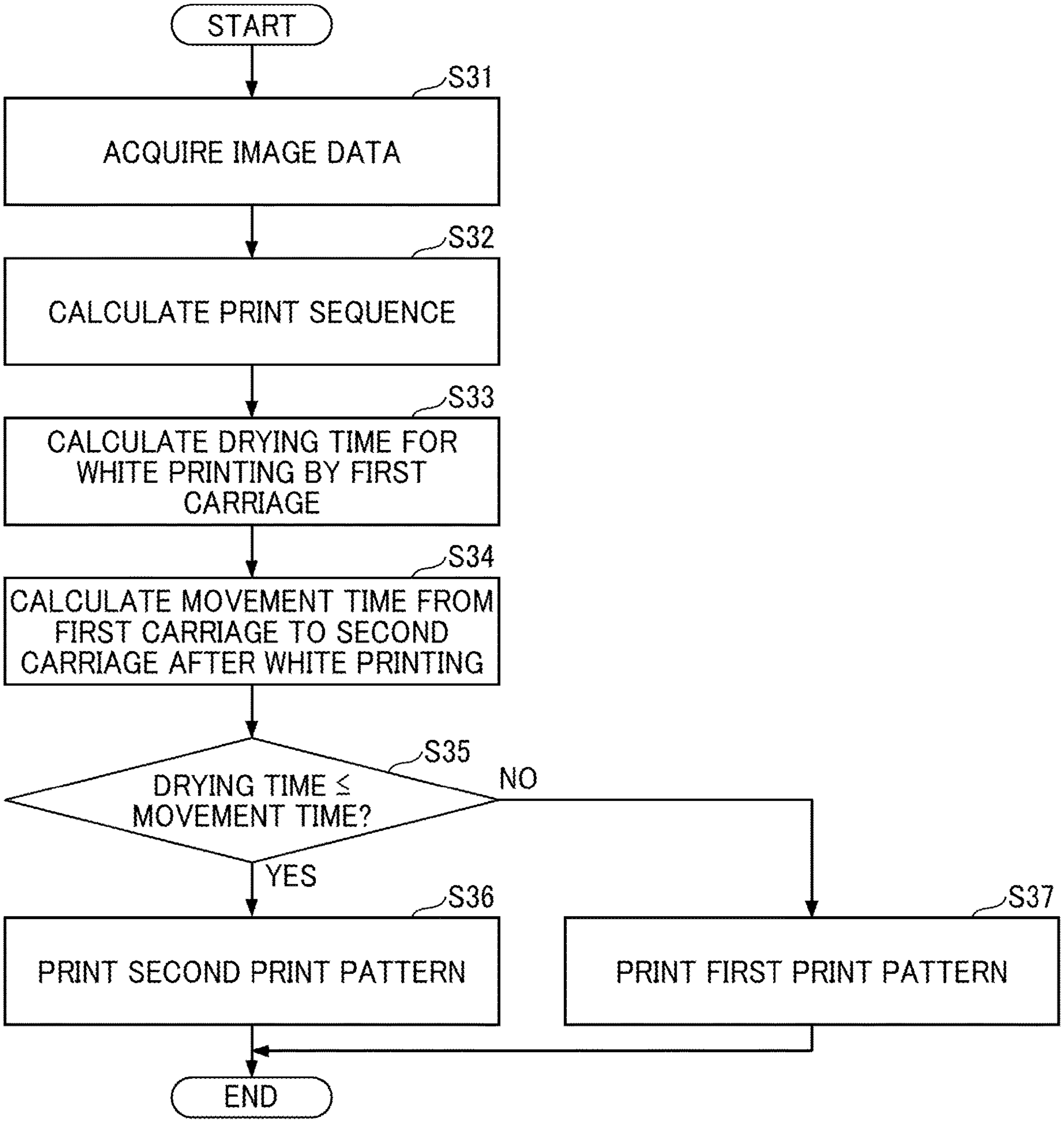
FIG. 8 is a flowchart of control to select a print pattern according to an embodiment of the present disclosure.

The print pattern selection control performed by the controller 10 is described with reference to FIG. 8. FIG. 8 is a flowchart of control to select the print pattern according to the present embodiment. In step S31, the controller 10 acquires image data. The controller 10 can acquire data of an image to be printed on the recording medium M by the image forming apparatus 100, for example, from an external device such as a personal computer (PC) communicably connected to the image forming apparatus 100. In step S32, the controller 10 calculates a print sequence based on the image data acquired in step S31. In the print sequence, the printing procedure of each of the first carriage 1A and the second carriage 1B is divided as illustrated in FIG. 6B and FIG. 7B to form an image on the recording medium M based on the image data.

In step S33, the controller 10 calculates the drying time of the white printing by the first carriage 1A based on the print sequence acquired in step S32. For example, the controller 10 calculates the drying time based on a discharge amount of liquid (white ink) to be discharged onto the recording medium M by the first carriage 1A in the image to be printed on the recording medium M. More specifically, the controller 10 increases the drying time with increasing the discharge amount of ink of the white printing P1 (when the discharge amount of ink is large). Here, the term “the discharge amount of ink is large” means that the number of interlaces is large, that is, the number of scans for the same area is large. In addition, the discharge amount of ink varies depending on the coverage rate of the image in the corresponding area. The controller 10 calculates the drying time required for each of the areas divided in the sub-scanning direction of the recording medium M, such as the areas R1, R2, R3, and R4 illustrated in FIGS. 6A to 7B.

In step S34, the controller 10 calculates a movement time of the recording medium M to the second carriage 1B after the white printing by the first carriage 1A in the second print pattern based on the print sequence acquired in step S32. For example, when there is a blank portion where the white printing by the first carriage 1A is not performed in the image to be printed on the recording medium M, the controller 10 can shortens the movement time based on a size of the blank portion in the calculation. For example, as illustrated in FIGS. 7A and 7B, when there is a blank portion where printing is not performed between the frontmost area R1 in which the printing is performed first and the backmost area R4 in which the printing is performed next to the frontmost area R1 in the conveyance direction, the printing by the first carriage 1A is not performed in the blank portion. As a result, as indicated by arrows G1 and G2 in FIG. 7B, the frontmost area R1 in which the printing has been completed by the first carriage 1A can be immediately moved to the printing position of the second carriage 1B. Accordingly, the controller 10 shortens the movement time of the recording medium M in calculation with an increase in the size of the blank portion. The controller 10 calculates the movement time for each of the areas divided in the sub-scanning direction of the recording medium M, such as the areas R1, R2, R3, and R4 illustrated in FIGS. 6A to 7B.

In step S35, the controller 10 determines whether the drying time calculated in step S33 is equal to or less than the movement time calculated in step S34. The controller 10 compares the drying time and the movement time for each of the areas divided in the sub-scanning direction of the recording medium M, such as the areas R1, R2, R3, and R4 illustrated in FIGS. 6A to 7B, and determines that the condition in step S35 is satisfied when the drying time is equal to or less than the movement time in all the areas. When the drying time is equal to or less than the movement time (YES in step S35), the controller 10 determines that the drying time of the white ink is sufficient before the color printing starts even in the second print pattern, the process proceeds to step S36, and the printing is performed in the second print pattern. On the other hand, when the drying time is more than the movement time (NO in step S35), the controller 10 determines that the drying time of the white ink is insufficient before the color printing starts in the second print pattern, the process proceeds to step S37, and the printing is performed in the first print pattern.

Effects obtained by the image forming apparatus 100 according to the present embodiment are described below. The image forming apparatus 100 according to the present embodiment includes the sub-scanning carriage 50, the first carriage 1A, the second carriage 1B, and the controller 10. The sub-scanning carriage 50 moves the recording medium M in the conveyance direction. The first carriage 1A moves in the main scanning direction orthogonal to the conveyance direction and discharges a liquid onto the recording medium M to print a first image on the recording medium M. The second carriage 1B moves in the main scanning direction and discharges another liquid different from the liquid onto the first image on the recording medium M to print a second image on the first image of the recording medium M. The controller 10 causes the second carriage 1B to print the second image after causing the first carriage 1A to finish printing the first image, to execute a first print sequence; causes the second carriage 1B to print the second image while causing the first carriage 1A to print the first image, to execute a second print sequence; calculates a drying time of the liquid to form the first image by the first carriage 1A, determines whether to execute the second print sequence based on the drying time; causes the first carriage 1A and the second carriage 1B to execute the second print sequence when the controller 10 determines to execute the second print sequence; and causes the first carriage 1A and the second carriage 1B to execute the first print sequence when the controller 10 determines not to execute the second print sequence.

With this configuration, the controller 10 calculates the drying time of the liquid to be discharged onto the recording medium M by the first carriage 1A, and determines whether to perform the second print pattern based on the drying time. Accordingly, when the drying time is insufficient, the controller 10 determines not to perform the second print pattern, thereby preventing the image quality of the printed image from being degraded. On the other hand, when the drying time is sufficient, the controller 10 performs the second print pattern, thereby increasing the print speed. As described above, according to the present embodiment, the image forming apparatus 100 increases the print speed while preventing the image quality of the printed image from being degraded.

In the image forming apparatus 100 according to the present embodiment, the controller 10 calculates the drying time of the ink that forms the first image to be printed on a portion of the recording medium M (e.g., the area R1 illustrated in FIGS. 6A to 7B). The controller 10 also calculates a movement time of the recording medium M moved by the sub-scanning carriage 50 from a finishing position at which the first carriage 1A finishes printing the first image on the portion of the recording medium M (e.g., the area R1) to a start position at which the second carriage 1B starts printing the second image on the portion of the recording medium M (e.g., the area R1). When the drying time is equal to or less than the movement time, the controller 10 executes the second print sequence, and when the drying time is more than the movement time, the controller 10 executes the first print sequence.

With this configuration, the controller 10 compares the drying time of the white printing P1 in the portion (e.g., the area R1) of the recording medium M by the first carriage P1 with the movement time of the recording medium M for moving the portion (e.g., the area R1) to the printing position of the second carriage 1B. When the drying time is equal to or less than the movement time, the controller 10 determines that the drying time of the white printing P1 in the portion is sufficient, and performs the second print pattern. Thus, since the controller 10 accurately determines whether the drying time of the white printing P1 is sufficient, the controller 10 does not select the first print pattern when the second print pattern can be performed, thereby appropriately adjusting the frequency of the second print pattern. Accordingly, the image forming apparatus 100 increases the print speed and prevents the image quality of the printed image from being degraded in a fine balance.

In the image forming apparatus 100 according to the present embodiment, the controller 10 prints the first image on the portion of the recording medium M in which a blank portion is formed other than the portion of the recording medium M, calculates the drying time of the liquid that forms the first image to be printed on the portion of the recording medium M, and calculates the movement time of the recording medium M moved through the blank portion in the conveyance direction by the sub-scanning carriage based on a size of the blank portion to shorten the movement time according to an increase in the size of the blank portion.

With this configuration, since the controller 10 accurately calculates the movement time based on a content of an image to be printed, the controller 10 more accurately determines whether the drying time of the white printing P1 is sufficient based on the information of the movement time in response to the content of the image to be printed.

In the image forming apparatus 100 according to the present embodiment, the controller 10 calculates the drying time based on a discharge amount of liquid to be discharged onto the recording medium M by the first carriage 1A in the first image to be printed on the recording medium M.

With this configuration, since the controller 10 accurately calculates the drying time based on a content of an image to be printed, the controller 10 more accurately determines whether the drying time of the white printing P1 is sufficient based on the information of the drying time in response to the content of the image to be printed.

In the image forming apparatus 100 according to the present embodiment, the liquid is a white ink, and another liquid is a color ink.

In the image forming apparatus 100 according to the present embodiment, the first carriage 1A and the second carriage 1B are arranged in parallel in the conveyance direction.

With this configuration, the image forming apparatus 100 can form color images on the recording medium M painted white.

The present embodiment has been described above with reference to specific examples. However, the present disclosure is not limited to the above-described specific examples. The modified specific examples including the features of the present disclosure, in which a person skilled in the art appropriately implements a design change, are also included in the scope of the present disclosure. Each element included in each specific example described above and the arrangement, condition, and shape thereof are not limited to the above-described specific examples and can be appropriately changed. The respective elements included in the above-described specific examples can be appropriately combined with each other unless technically contradicted.

As described above, according to the present embodiment, the image forming apparatus increases the print speed while preventing the image quality of the printed image from being degraded.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a sub-scanning carriage configured to move a recording medium in a conveyance direction;

a first carriage configured to:

move in a main scanning direction orthogonal to the conveyance direction; and discharge a liquid onto the recording medium to print a first image on the recording medium;

a second carriage configured to:

move in the main scanning direction; and discharge another liquid different from the liquid onto the first image on the recording medium to print a second image on the first image of the recording medium; and circuitry configured to:

cause the second carriage to print second image after causing the first carriage to finish printing the first image, to execute a first print sequence;

cause the second carriage to print second image while causing the first carriage to print the first image, to execute a second print sequence;

calculate a drying time of the liquid to form the first image by the first carriage;

determine whether to execute the second print sequence based on the drying time;

cause the first carriage and the second carriage to execute the second print sequence when the circuitry determines to execute the second print sequence;

cause the first carriage and the second carriage to execute the first print sequence when the circuitry determines not to execute the second print sequence;

calculate the drying time of the liquid that forms the first image to be printed on a portion of the recording medium;

calculate a movement time of the recording medium moved by the sub-scanning carriage from a finishing position at which the first carriage finishes printing the first image on the portion of the recording medium to a start position at which the second carriage starts printing the second image onto the first image printed on the portion of the recording medium;

execute the second print sequence when the drying time is equal to or less than the movement time;

execute the first print sequence when the drying time is more than the movement time;

print the first image on the portion of the recording medium in which a blank portion is formed other than the portion of the recording medium; and calculate the movement time of the recording medium moved through the blank portion in the conveyance direction by the sub-scanning carriage based on a size of the blank portion to shorten the movement time according to an increase in the size of the blank portion.

2. The image forming apparatus according to claim 1, wherein the circuitry is configured to calculate the drying time based on an amount of the liquid to be discharged onto the recording medium by the first carriage.

3. The image forming apparatus according to claim 1, wherein the liquid is a white ink; and said another liquid is a color ink.

4. The image forming apparatus according to claim 1, wherein the first carriage and the second carriage are arranged in parallel in the conveyance direction.

* * * * *